United States Patent
Kitazawa

(10) Patent No.: US 12,430,777 B2
(45) Date of Patent: Sep. 30, 2025

(54) IMAGE PROCESSING APPARATUS, IMAGE PROCESSING METHOD, AND NON-TRANSITORY COMPUTER-READABLE STORAGE MEDIUM TO PERFORM A TRACKING PROCESS, USING A TRACKING MODEL

(71) Applicant: CANON KABUSHIKI KAISHA, Tokyo (JP)

(72) Inventor: Motoki Kitazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 17/985,975

(22) Filed: Nov. 14, 2022

(65) Prior Publication Data

US 2023/0177705 A1 Jun. 8, 2023

(30) Foreign Application Priority Data

Dec. 2, 2021 (JP) .................................. 2021-196465

(51) Int. Cl.
*G06T 7/246* (2017.01)
*G06T 7/11* (2017.01)

(52) U.S. Cl.
CPC ................ *G06T 7/251* (2017.01); *G06T 7/11* (2017.01); *G06T 7/248* (2017.01); *G06T 2207/20084* (2013.01)

(58) Field of Classification Search
CPC . G06T 7/251; G06T 7/11; G06T 7/248; G06T 2207/20084; G06T 2207/10016; G06T 2207/20081; G06T 2207/20104
See application file for complete search history.

(56) References Cited

U.S. PATENT DOCUMENTS

| 10,127,438 | B1 * | 11/2018 | Fisher | G06V 10/82 |
| 10,334,230 | B1 * | 6/2019 | Rush | H04N 13/257 |
| 11,100,335 | B2 * | 8/2021 | Winter | G06V 20/41 |
| 11,343,526 | B2 * | 5/2022 | Wang | H04N 19/176 |
| 2011/0311100 | A1 * | 12/2011 | Fan | G06T 7/248 |
| | | | | 382/103 |

(Continued)

FOREIGN PATENT DOCUMENTS

| JP | 4769943 B | 9/2011 |
| JP | 6557033 B | 8/2019 |

OTHER PUBLICATIONS

Liu, W. et al., "SSD: Single Shot Multibox Detector" ECCV 2016 (Dec. 2016) pp. 1-17, arXiv:1512.02325v5.

(Continued)

*Primary Examiner* — Mia M Thomas
(74) *Attorney, Agent, or Firm* — Carter, DeLuca & Farrell LLP

(57) ABSTRACT

An image processing apparatus comprises a tracking unit configured to perform a tracking process, using a tracking model, in which a tracking target in a captured image is tracked, and a switching unit configured to switch the tracking model to a first model that tracks a second object as the tracking target when masking of the first object by the second object is detected while the tracking unit tracks the first object as the tracking target, and to switch the tracking model to a second model that tracks the first object as the tracking target when termination of the masking is detected.

10 Claims, 10 Drawing Sheets

(56) References Cited

U.S. PATENT DOCUMENTS

| | | | | |
|---|---|---|---|---|
| 2015/0146022 A1* | 5/2015 | Pham | ............... | H04N 23/6811 |
| | | | | 348/208.4 |
| 2016/0260226 A1* | 9/2016 | Yano | ............... | G06V 20/52 |
| 2019/0043003 A1* | 2/2019 | Fisher | ............... | G06V 10/82 |
| 2021/0183076 A1* | 6/2021 | Ishikake | ............... | G06T 7/246 |
| 2022/0072425 A1* | 3/2022 | Orlandi | ............... | A63F 13/213 |
| 2023/0360229 A1* | 11/2023 | Kogai | ............... | G06V 10/751 |

OTHER PUBLICATIONS

Notice of Reasons for Refusal issued by the Japanese Patent Office on Jul. 18, 2025 in corresponding JP Patent Application No. 2021-196465, with English translation.

* cited by examiner

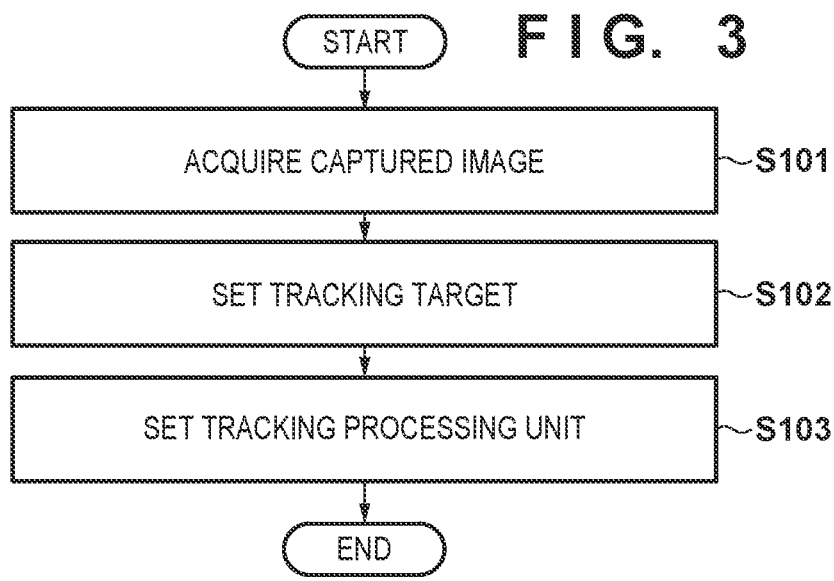
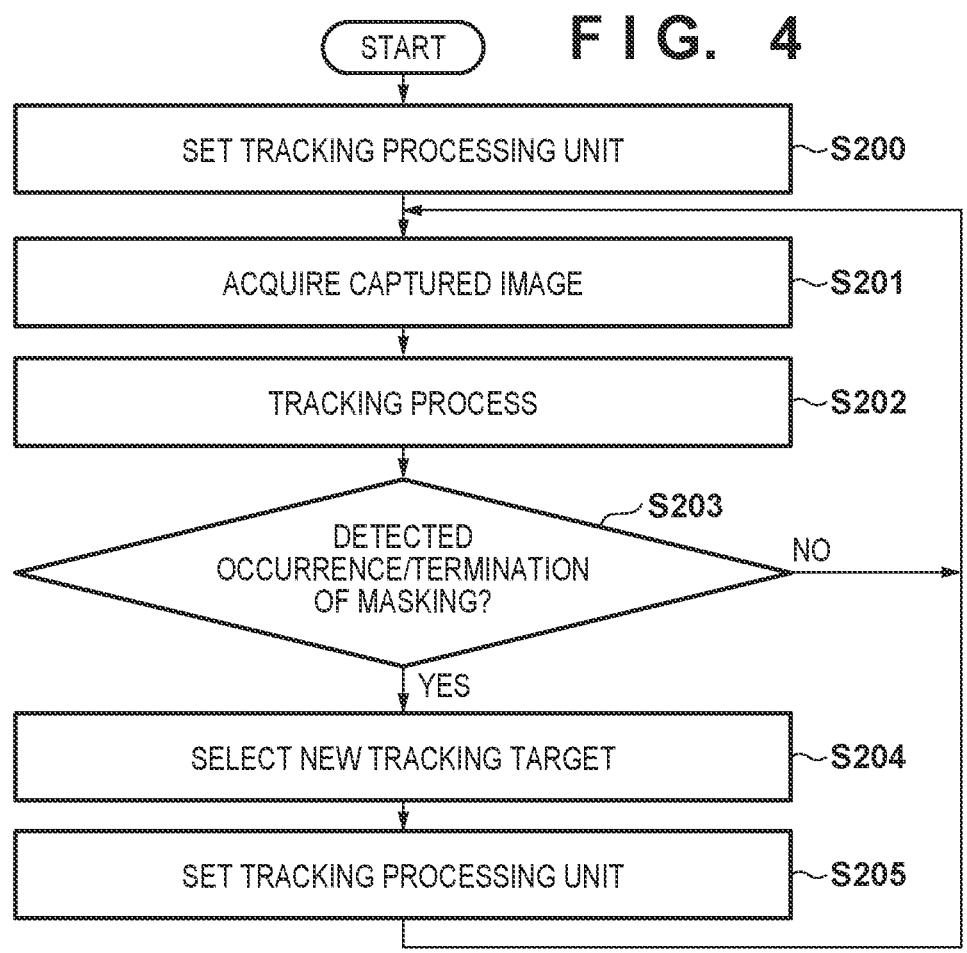

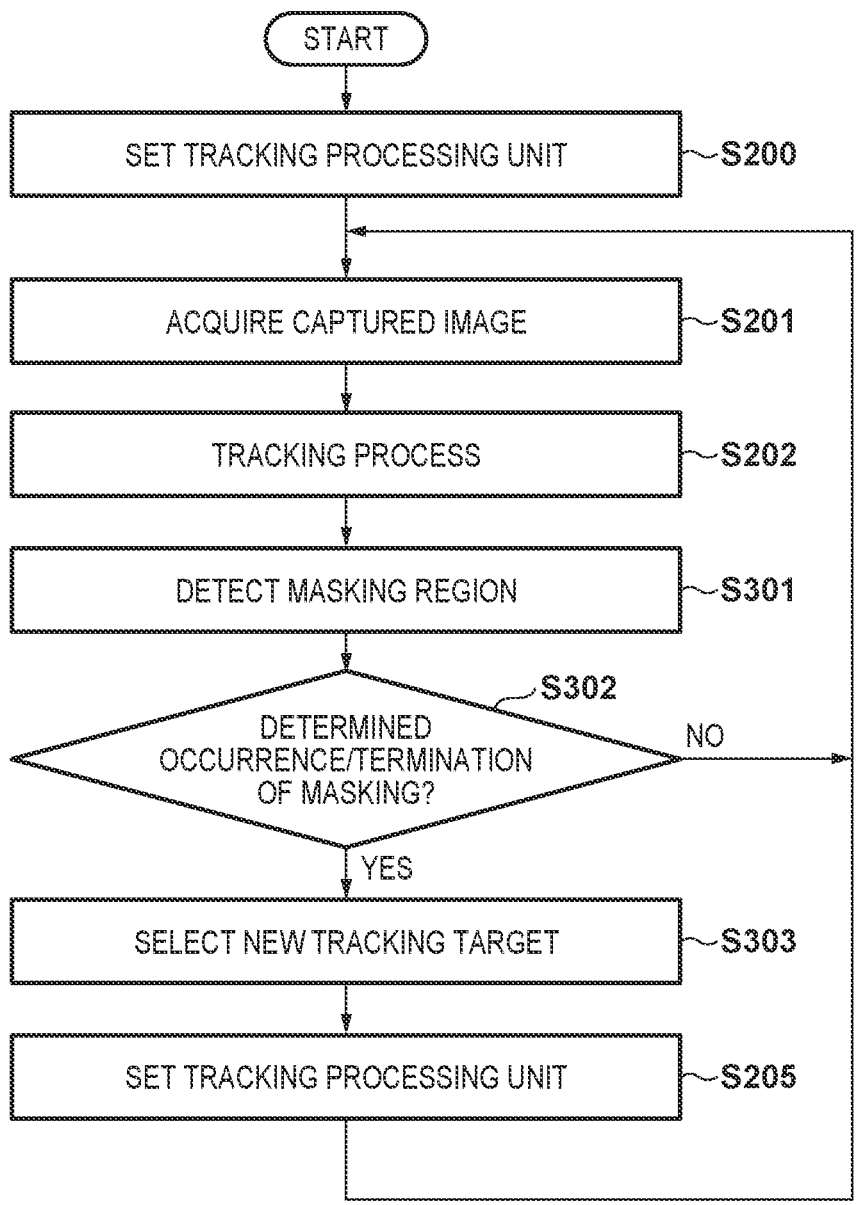

IMAGE PROCESSING APPARATUS, IMAGE PROCESSING METHOD, AND NON-TRANSITORY COMPUTER-READABLE STORAGE MEDIUM TO PERFORM A TRACKING PROCESS, USING A TRACKING MODEL

BACKGROUND OF THE INVENTION

Field of the Invention

The present invention relates to a tracking technology.

Description of the Related Art

There are technologies for tracking an object in an image, such as those using luminance or color information and those using template matching or a Deep Neural Network (DNN). However, in any method, correspondence when a tracking destination is masked by another object is important. As such correspondence, conventionally, by setting a plurality of feature points for the tracking destination, tracking becomes possible even when the tracking destination is partially masked or by predicting a movement position using a movement vector of the tracking destination, tracking can be continued.

Japanese Patent No. 4769943 discloses a technology that, when a tracking destination is masked by a masking material, the masking material is recognized as a temporary tracking target and the tracking is continued. When the tracking destination appears again, the tracking target is returned to the tracking destination to allow continuing the tracking of the tracking destination.

In the method disclosed in Japanese Patent No. 4769943, to track the masking material as a temporary tracking target, a tracking model lowers a threshold value for detecting the tracking destination. However, in the method of Japanese Patent No. 4769943, while the masking material is tracked as the temporary tracking target, when another object having an appearance similar to the masking material appears in an image, the temporary tracking target possibly transitions to the other object, and the subsequent tracking of the tracking destination does not possibly normally operate.

SUMMARY OF THE INVENTION

The present invention provides a technology for improving tracking accuracy of a tracking destination more than conventional one.

According to the first aspect of the present invention, there is provided an image processing apparatus, comprising: a tracking unit configured to perform a tracking process, using a tracking model, in which a tracking target in a captured image is tracked; and a switching unit configured to switch the tracking model to a first model that tracks a second object as the tracking target when masking of the first object by the second object is detected while the tracking unit tracks the first object as the tracking target, and to switch the tracking model to a second model that tracks the first object as the tracking target when termination of the masking is detected.

According to the second aspect of the present invention, there is provided an image processing method, comprising: performing a tracking process, using a tracking model, in which a tracking target in a captured image is tracked; and switching the tracking model to a first model that tracks a second object as the tracking target when masking of the first object by the second object is detected while the first object is tracked in the tracking as the tracking target, and switching the tracking model to a second model that tracks the first object as the tracking target when termination of the masking is detected.

According to the third aspect of the present invention, there is provided a non-transitory computer-readable storage medium that stores a computer program for causing a computer to function as: a tracking unit configured to perform a tracking process, using a tracking model, in which a tracking target in a captured image is tracked; and a switching unit configured to switch the tracking model to a first model that tracks a second object as the tracking target when masking of the first object by the second object is detected while the tracking unit tracks the first object as the tracking target, and to switch the tracking model to a second model that tracks the first object as the tracking target when termination of the masking is detected.

Further features of the present invention will become apparent from the following description of exemplary embodiments with reference to the attached drawings.

BRIEF DESCRIPTION OF THE DRAWINGS

FIG. 3 is a flowchart of a setting process of a tracking destination.

FIG. 4 is a flowchart of a tracking process.

FIG. 6 is a flowchart of the tracking process.

DESCRIPTION OF THE EMBODIMENTS

Figure 1:
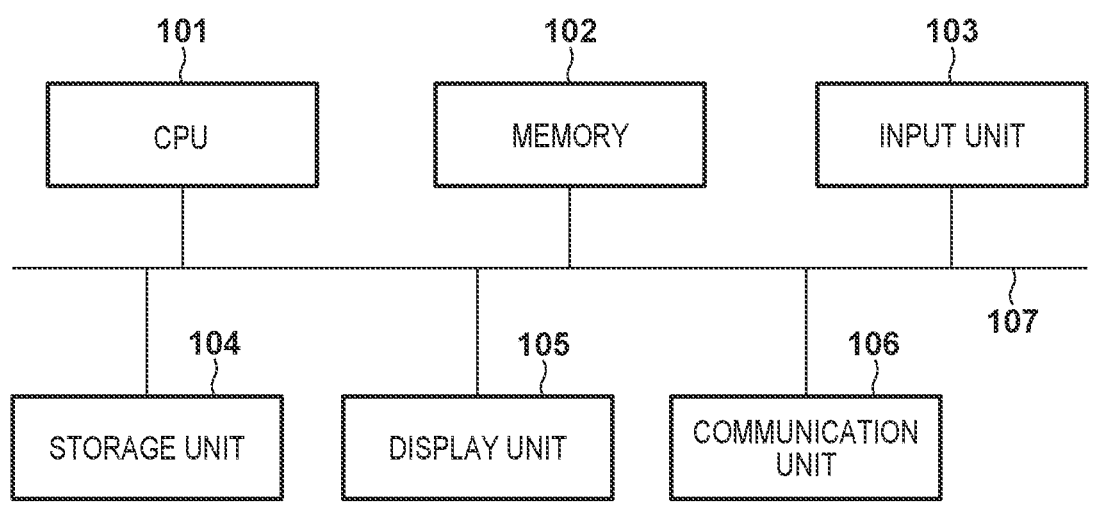
FIG. 1 is a block diagram illustrating an exemplary hardware configuration of an image processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the present embodiment, the description is given of an image processing apparatus that performs a tracking process of tracking a tracking target in a captured image using a tracking model. When it is detected that a first object is masked by a second object during tracking of the first object as a tracking target, the image processing apparatus according to the present embodiment switches the tracking model to a first model that tracks the second object as the tracking target. In the image processing apparatus according to the present embodiment, when termination of the masking is detected, the tracking model is switched to a second model that tracks the first object as the tracking target.

Here, the "tracking target" refers to an object determined as a tracking target by a process described later among an object (tracking destination) designated in advance as a destination object to be tracked and an object (a masking material) determined as masking the tracking destination.

An exemplary hardware configuration of an image processing apparatus according to the present embodiment will be described using a block diagram of FIG. 1. The configuration illustrated in FIG. 1 is merely an example and can be modified/changed as appropriate.

A CPU 101 executes various processes using computer programs and data stored in a memory 102. Accordingly, the CPU 101 controls the operation of the entire image processing apparatus and performs or controls various processes described with an assumption to be performed by the image processing apparatus.

The memory 102 includes an area for storing computer programs and data loaded from a storage unit 104 and an area for storing data received from outside via a communication unit 106. Additionally, the memory 102 also includes a work area used when the CPU 101 performs various processes. In this way, the memory 102 can provide the various areas as appropriate.

An input unit 103, which is a user interface, such as a keyboard, a mouse or a touch panel, is operated by a user to allow inputting various instructions to the CPU 101.

The storage unit 104 is a non-volatile memory device, such as a hard disk drive device. The storage unit 104 stores, for example, computer programs and data for the CPU 101 to perform or control various processes described with an assumption to be performed by an operating system (OS) or the image processing apparatus. The computer programs and data stored in the storage unit 104 are loaded into the memory 102 as appropriate according to the control by the CPU 101 and to be processed by the CPU 101.

A display unit 105 is a display device including a liquid crystal screen or a touch panel screen, and can display the results of processes by the CPU 101 using, for example, images and characters. Here, the display unit 105 may be a projection device, such as a projector that projects images or characters.

The communication unit 106 is a communication interface for performing data communication with an external device via a wired and/or wireless network, such as LAN and the Internet. The CPU 101, the memory 102, the input unit 103, the storage unit 104, the display unit 105, and the communication unit 106 are all connected to a system bus 107.

Figure 2:
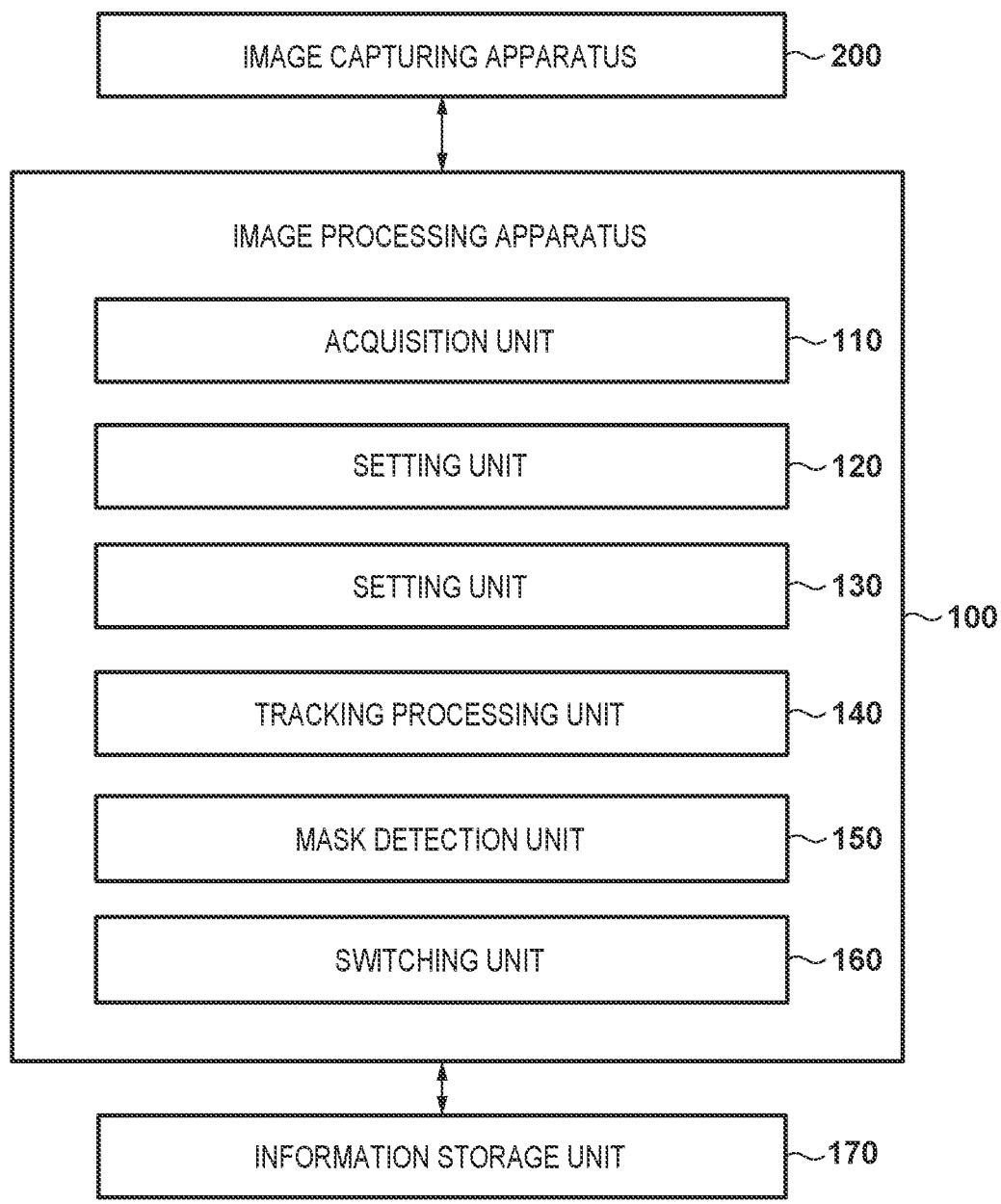
FIG. 2 is a block diagram illustrating a functional configuration example of a system.

Next, a functional configuration example of a system according to the present embodiment including the image processing apparatus will be described using a block diagram of FIG. 2. As illustrated in FIG. 2, in the system according to the present embodiment, an image capturing apparatus 200 and an information storage unit 170 are connected to an image processing apparatus 100. The image processing apparatus 100 performs data communications with the image capturing apparatus 200 and the information storage unit 170 via the communication unit 106.

First, the image capturing apparatus 200 will be described. The image capturing apparatus 200 is an image capturing apparatus, such as a digital camera or a surveillance camera. The image capturing apparatus 200 may be an apparatus that captures motion images and acquires an image in each frame in the motion image as a captured image, or may be an apparatus that regularly or irregularly captures still images and acquires the still images as captured images. The image capturing apparatus 200 outputs the acquired captured image to the image processing apparatus 100.

Next, the information storage unit 170 will be described. The information storage unit 170 is "a storage device that can communicate with the image processing apparatus 100 via a wired and/or wireless network, such as LAN and the Internet," for example, a non-volatile memory device, such as a hard disk drive device, and a server device. The information storage unit 170 may be an external memory device, such as a USB memory device. The image processing apparatus 100 appropriately stores information necessary for tracking the tracking target in the captured image in the information storage unit 170. Note that the information storage unit 170 is not essential, and the storage unit 104 may be used instead of the information storage unit 170.

Now, the image processing apparatus 100 will be described. The image processing apparatus 100 acquires the captured image output from the image capturing apparatus 200 and tracks the tracking target in the acquired captured image. The following describes each function unit in the image processing apparatus 100 as a main unit for a process in some cases. However, actually, the functions of the function unit are achieved by executing the computer program for the CPU 101 to perform the function of the function unit by the CPU 101.

To perform such a tracking process in the image processing apparatus 100, it is necessary to preset the object (the tracking destination) that is the destination of tracking. The setting process of the tracking destination will be described with reference to a flowchart in FIG. 3.

At step S101, an acquisition unit 110 acquires a single captured image captured by the image capturing apparatus 200. The single captured image is, for example, a captured image in the first frame in a captured image group (a still image group or an image group in motion images) target for the tracking process. Note that the acquisition unit 110 may acquire an image in a partial region in the captured image, such as an object region of an object in the captured image or a partial object region in the object (an object region of a portion, such as a face) as a captured image again.

In step S102, a setting unit 120 performs the setting process that sets one of the objects included in the captured image acquired by the acquisition unit 110 in step S101 as a tracking destination. The setting process of tracking destination includes various setting processes, and is not limited to a specific setting process.

For example, the setting unit 120 causes the display unit 105 to display the captured image acquired by the acquisition unit 110 in step S101 to accept a designating operation of the object region of tracking destination from the user. The user checks the captured image displayed on the display unit 105, and performs the designating operation that designates the object region of tracking destination to set one of the objects included in the captured image as the tracking destination. There are various designation methods as the designation method of the object region by the user, and the method is not limited to a specific designation method in the present embodiment. For example, when the display unit 105 includes a touch panel screen, the user may designate the object region of tracking destination on the touch panel screen. The user may operate the input unit 103 to designate the object region of tracking destination. Then, the setting unit 120 sets the object region designated in response to the user operation as the object region of tracking destination.

Note that the setting unit 120 may detect an object region of a subject that becomes the tracking destination from the captured image, and set the detected object region of the subject as the object region of tracking destination. As a method of automatically detecting a main subject in the captured image, for example, the method described in Japanese Patent No. 6557033 is applicable.

Further, the setting unit 120 may use both a technology for detecting an object region of an object from a captured image and a user operation to set the object region of tracking destination in the captured image. The technology for detecting the object region of the object from the captured image includes, for example, "Liu, SSD: Single Shot Multibox Detector. In: ECCV 2016."

In step S103, a setting unit 130 uses the image (the tracking destination image) in the object region set as the object region of tracking destination in step S102 to construct "a tracking model used to track the tracking destination by a tracking processing unit 140 (a tracking destination model)". Various models are applicable as the tracking destination model, and therefore there are various construction methods as the construction method of tracking destination model.

For example, in a case where the tracking destination model is a neural network, such as a DNN, the setting unit 130 performs a learning process of the neural network using the tracking destination image, and acquires the learned neural network obtained by the learning process as a tracking destination model.

For example, in a case where the tracking destination model is a tracking model that performs template matching, the setting unit 130 acquires the tracking model that performs template matching with the tracking destination image as the tracking destination model.

In this manner, the setting unit 130 performs a process for constructing the tracking destination model used by the tracking processing unit 140 to track the tracking destination as the setting process of the tracking processing unit 140. The setting unit 130 stores the tracking destination model thus constructed (such as a parameter of the tracking destination model) and the tracking destination image in the information storage unit 170.

Next, a process performed by the image processing apparatus 100 to track the tracking target in each of captured images output from the image capturing apparatus 200 after the above-described setting process will be described with reference to the flowchart of FIG. 4.

In step S200, the setting unit 130 sets the tracking destination model as the tracking model used by the tracking processing unit 140 to track the tracking target. More specifically, the setting unit 130 reads the tracking destination model stored in the information storage unit 170 in the setting process described above, and sets the tracking destination model that has been read as the tracking model used to track the tracking target by the tracking processing unit 140. Then, processes of steps S201 to S205 are performed on each captured image output from the image capturing apparatus 200.

In step S201, the acquisition unit 110 acquires the captured image output from the image capturing apparatus 200. Note that, similarly to step S101 described above, the image in the partial region in the captured image may be acquired as a captured image again.

In step S202, the tracking processing unit 140 performs the tracking process that tracks the tracking target in the captured image acquired by the acquisition unit 110 in step S201 using the tracking model set by the setting unit 130.

In step S202 when the process advances step S200→step S201→step S202, the tracking processing unit 140 performs the tracking process of tracking target in the captured image using the tracking destination model set by the setting unit 130 in step S200. Thus, the tracking process of tracking destination in the captured image is performed.

In step S202 when the process advances step S205→step S202, the tracking processing unit 140 performs the tracking process of tracking target in the captured image using the tracking model set by the setting unit 130 in step S205. In this way, the tracking process of tracking target switched in step S204 is performed in the captured image.

In step S202 when the process advances step S203→step S202, the tracking processing unit 140 performs the tracking process of tracking target in the captured image using the tracking model currently set.

The tracking processing unit 140 outputs, based on the object region of the tracking target in the captured image in the previous frame, a plurality of object candidate regions, which are candidates of the object region of tracking target in the captured image in the current frame, and likelihood of the object candidate region (likelihood indicative of resemblance of the tracking target) using the tracking model. Then, the tracking processing unit 140 determines the object candidate region having the highest likelihood among the plurality of object candidate regions as the object region of tracking target. In a case where the tracking destination model is set as the tracking model used, the tracking processing unit 140 outputs a plurality of object candidate regions, which are candidates of the object region of tracking destination in the captured image in the current frame, and likelihood of the object candidate region. Then, the tracking processing unit 140 determines the object candidate region having the highest likelihood among the plurality of object candidate regions as the object region of tracking destination. Examples of the technology that performs this process include "Real-Time MDNet, ECCV 2018." However, as long as the plurality of object candidate regions, which are candidates of the object region of tracking target in the captured image in the current frame, and likelihood of the object candidate region (likelihood indicative of resemblance of the tracking target) can be calculated, another technology may be employed.

Note that in the example described above, the tracking processing unit 140 determines the object candidate region having the highest likelihood among the plurality of object candidate regions as the object region of tracking target, but may determine the object region of tracking target by another criterion. For example, a distance between the position of the object region of tracking target in the captured image in the previous frame and the position of each object candidate region in the captured image in the current frame is obtained. Then, among the respective object candidate regions in the captured image in the current frame, the object candidate region with which the shortest distance is obtained is determined as the object region of tracking target.

In the case where the tracking model is a neural network that performs online learning, the tracking processing unit 140 may relearn the tracking model using the image in the object region of tracking target in the captured image in the current frame and store the relearned tracking model and the image in the information storage unit 170. In a case where the tracking model is a tracking model that performs template matching, the tracking processing unit 140 may store the image in the object region of tracking target in the captured image in the current frame as an image used by the tracking model in the template matching in the information storage unit 170.

In a case where the tracking destination model is set as the tracking model, the tracking processing unit 140 regularly or irregularly performs the storage process that stores the image in the object candidate region determined as the object region of tracking target in the captured image in the current frame in the information storage unit 170.

In step S203, a mask detection unit 150 determines whether the tracking destination is masked by another object (a masking material) or the masking is terminated in the captured image acquired by the acquisition unit 110 in step S201. There are various methods to determine whether the tracking destination is masked by the masking material or the masking is terminated in the captured image and is not limited to the specific method in the present embodiment.

Whether the tracking destination is masked by the masking material in the captured image can be performed, for example, by the following determination process. In other words, the mask detection unit 150 determines that the tracking destination is masked by the masking material in the captured image when the condition "the likelihood of the object candidate region determined to be the object region of tracking destination in the tracking process of tracking destination by the tracking processing unit 140 is less than a threshold value and another object candidate region overlapping with the object candidate region is present" is met. On the other hand, when this condition is not met, the mask detection unit 150 determines that the tracking destination is not masked by the masking material in the captured image.

Whether the masking has been terminated can be determined, for example, by the following determination process. In a case where another object candidate region overlapping with the object candidate region determined as the object region of the masking material in the tracking process of the masking material by the tracking processing unit 140 is present, the mask detection unit 150 obtains a degree of similarity between the image in the other object candidate region and "the image in the object candidate region determined as the object region of tracking destination" stored in the information storage unit 170. Then, when the degree of similarity is the threshold value or more, the mask detection unit 150 determines that the masking is terminated (the tracking destination appears in the captured image again).

As a result of such a determination, when it is determined that the tracking destination is masked by the masking material or the masking is terminated (when the occurrence of the masking is detected or the termination of the masking is detected) in the captured image acquired by the acquisition unit 110 in step S201, the process proceeds to step S204. On the other hand, as a result of such a determination, when neither the occurrence of the masking or the termination of the masking is detected, the process proceeds to step S201, and processes in the following respective steps are performed for the next frame.

In step S204, a switching unit 160 switches (selects) the tracking target tracked by the tracking processing unit 140. Here, the operation of the switching unit 160 in step S204 differs between a case where the mask detection unit 150 detects the occurrence of the masking and a case where the termination of the masking is detected.

In a case where the mask detection unit 150 detects the occurrence of the masking, the switching unit 160 determines that "the other object candidate region most overlapping with the object candidate region determined as the object region of tracking destination" as the object region of the masking material and selects the masking material as the tracking target.

On the other hand, in a case where the mask detection unit 150 detects the termination of the masking, the switching unit 160 determines that "the other object candidate region most overlapping with the object candidate region determined as the object region of the masking material" as the object region of tracking destination and selects the tracking destination as the tracking target.

In step S205, the switching unit 160 instructs the setting unit 130 to set "the tracking model for tracking the tracking target selected in step S204" as a tracking model used for tracking the tracking target by the tracking processing unit 140. Here, the operation of the switching unit 160 in step S205 differs between a case where the mask detection unit 150 detects the occurrence of the masking and a case where the termination of the masking is detected.

In a case where the mask detection unit 150 detects the occurrence of the masking, the switching unit 160 instructs the setting unit 130 to set "the tracking model that tracks the masking material (the masking material model)" as the tracking model used to track the tracking target by the tracking processing unit 140. In response to the instruction, the setting unit 130 sets the masking material model as the tracking model used to track the tracking target by the tracking processing unit 140, and the information storage unit 170 stores the masking material model. When the tracking model that performs template matching is used as the masking material model, the setting unit 130 constructs the tracking model (the masking material model) that performs template matching using the image in the object candidate region determined as the object region of the masking material. On the other hand, in a case of using a neural network, such as a DNN, as the masking material model, the setting unit 130 performs a learning process (online learning) of the neural network using an image (a positive case) in the object candidate region determined as the object region of the masking material or an image (a negative case) in the object candidate region not determined as the object region of the masking material to construct the learned neural network as the masking material model.

In other words, in a case where the mask detection unit 150 detects the occurrence of the masking, the masking material model is constructed using at least the image in the object candidate region determined as the object region of the masking material, and the tracking processing unit 140 switches the tracking model used in the tracking of tracking target to the constructed masking material model.

On the other hand, when the mask detection unit 150 detects the termination of the masking, the switching unit 160 instructs the setting unit 130 to set the tracking destination model as the tracking model used to track the tracking target by the tracking processing unit 140. In response to the instruction, the setting unit 130 sets the tracking destination model stored in the information storage unit 170 as the tracking model used to track the tracking target by the tracking processing unit 140.

In other words, in the present embodiment, when the mask detection unit 150 detects the termination of the masking, the tracking processing unit 140 switches the tracking model used to track the tracking target to the tracking destination model stored in the information storage unit 170.

The tracking processing unit 140 performs tracking process of tracking target using the tracking model (the tracking destination model) that is set initially or the tracking model switched by recent switching unless new switching occurs.

In a case where the masking material is tracked as a temporary tracking target and the masking material is not accurately tracked, when another object visually similar to the masking material appears in the image, the temporary tracking target probably transitions to the other object. As a result, there is a possibility that the subsequent tracking of tracking destination does not normally operate.

In contrast, in the present embodiment, when the tracking destination is not masked by the masking material, further accurate tracking process of tracking destination is performed by the use of the tracking destination model. When the tracking destination is masked by the masking material, further accurate tracking process of masking material is performed by the use of the masking material model. As a result, even when another object visually similar to the masking material appears in the image while the tracking destination is masked by the masking material, the masking material can be accurately tracked continuously, and even when the tracking destination appears in the image again, the tracking destination can be more accurately tracked.

Second Embodiment

In the following embodiments including the present embodiment, difference from the first embodiment will be described, assuming that the following embodiments are similar to the first embodiment unless otherwise specified. In the present embodiment, the tracking target is determined based on the region of the masking material in the captured image (the masking material region) and the region of the object (a masked material region) masked by the masking material (a masked material region).

Figure 5:
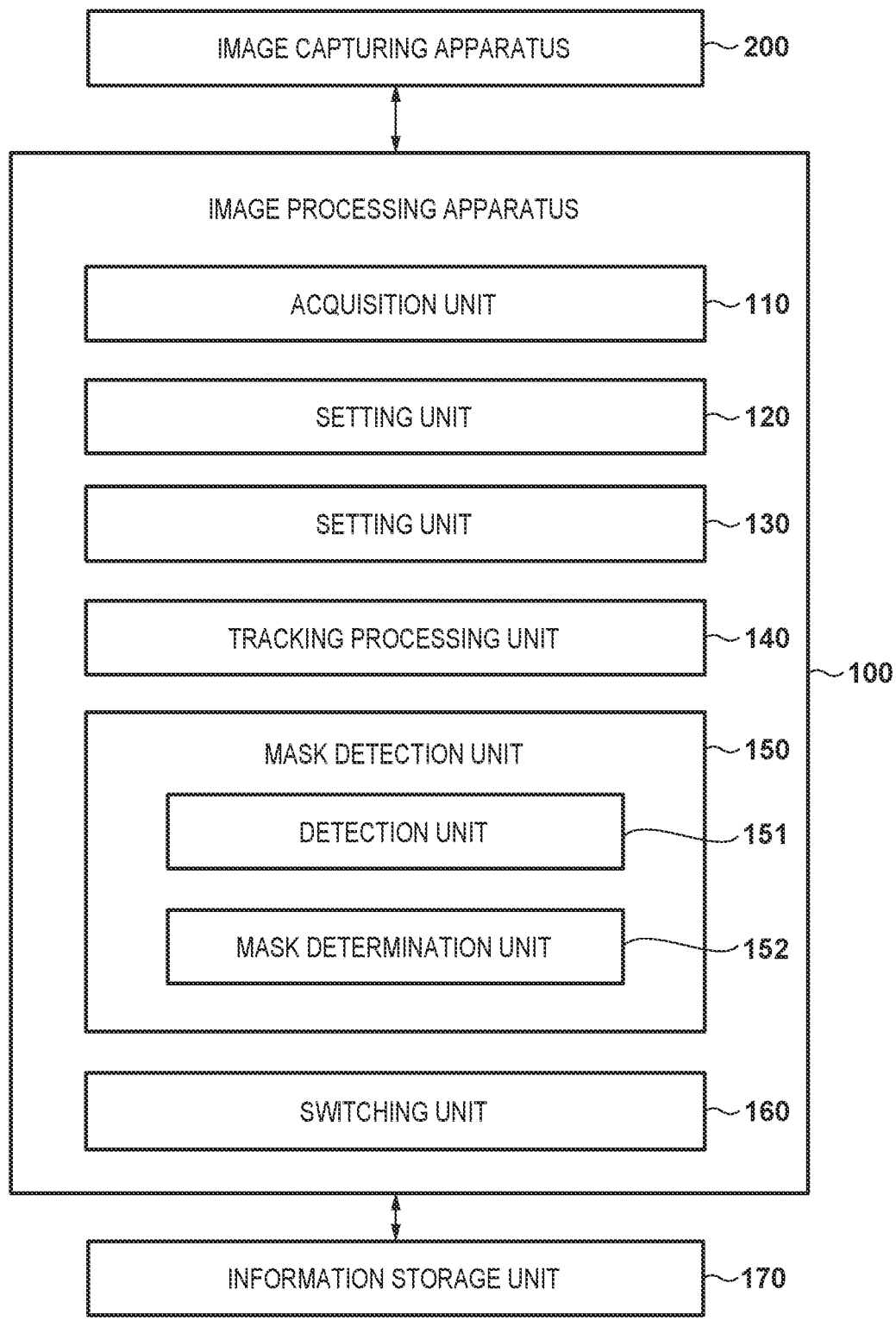
FIG. 5 is a block diagram illustrating a functional configuration example of a system.

A functional configuration example of a system according to the present embodiment will be described using a block diagram of FIG. 5. The system according to the present embodiment as illustrated in FIG. 5 differs from the first embodiment in that the mask detection unit 150 includes a detection unit 151 that detects the masking material region and the masked material region, and a mask determination unit 152 that detects the occurrence of the masking and the termination of the masking based on the masking material region and the masked material region.

Next, a process performed by the image processing apparatus 100 to track the tracking target in each of captured images output from the image capturing apparatus 200 after the above-described setting process will be described with reference to the flowchart of FIG. 6. In FIG. 6, process steps identical to process steps depicted in FIG. 4 bear the same step numbers thereof, with descriptions of the process steps being omitted.

In step S301, the detection unit 151 outputs a map (a masking material region map) that holds a value (likelihood) representing resemblance of the masking material for each pixel of the captured image, and a map (a masked material region map) that holds a value (likelihood) representing resemblance of the masked material for each pixel of the captured image.

Figure 7A:
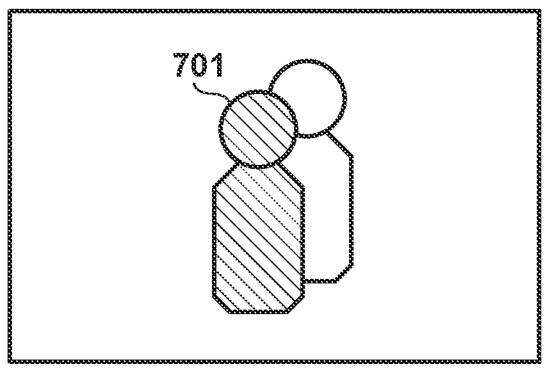
FIG. 7A is a diagram illustrating an example of a masking material region map.
Figure 7B:
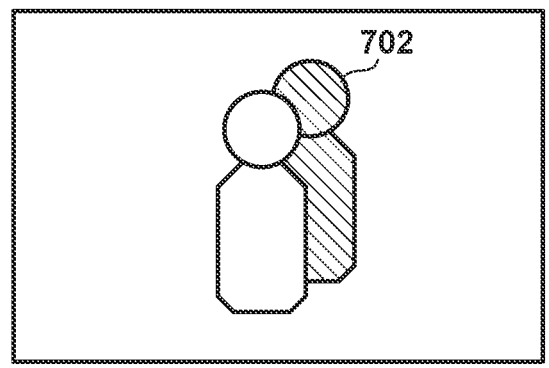
FIG. 7B is a diagram illustrating an example of a masked material region map.

FIG. 7A illustrates an example of the masking material region map. Further, FIG. 7B illustrates an example of the masked material region map. FIG. 7A includes two persons, and a portion of one person is masked by the other person. A region 701 is a region of the person as a masking material, for example, a region corresponding the pixel where a value (likelihood) representing resemblance of the masking material is a threshold value or more. FIG. 7B includes two persons, and a portion of one person is masked by the other person. A region 702 is a region of the person as a masked material, for example, a region corresponding the pixel where a value (likelihood) representing resemblance of the masked material is a threshold value or more.

As such a technology for acquiring the masking material region map and the masked material region map from the captured image, application of "Olaf Ronneberger, Philipp Fischer, Thomas Brox, U-Net: Convolutional Networks for Biomedical Image Segmentation: MICCAI2015" is considered. In this technology, it is possible to output the region of the object captured in another image by learning the image in which a particular object is captured in advance. Thus, learning the masking material and the masked material using this technology allows outputting the masking material region map and the masked material region map as illustrated in FIGS. 7A and 7B. Moreover, the output region may be other than the example illustrated in the drawings, and as long as the positions of masking material region and the masked material can be identified, any region may be used.

In step S302, the mask determination unit 152 determines whether the tracking destination is masked by the masking material in the captured image acquired by the acquisition unit 110 in step S201 or the masking is terminated based on the masking material region map and the masked material region map output by the detection unit 151. The determination method will be described by being divided into a case where the tracking target is a tracking destination and a case where the tracking target is a masking material, and the respective cases will be described using FIGS. 8A and 8B and FIGS. 9A and 9B.

First, the process of step S302 when the tracking target is the tracking destination will be described. First, the mask determination unit 152 sets any partial region (for example, a region near the center position of the object candidate region) in the object candidate region of tracking target in the captured image as a masking determination region. Then, the mask determination unit 152 determines whether the masked material region is included in the corresponding region corresponding to the masking determination region in the masked material region map. Then, as a result of the determination, when the corresponding region includes the masked material region, the mask determination unit 152 determines that masking is occurring, and when the corresponding region does not include the masked material region, the mask determination unit 152 determines that masking is not occurring. Note that when the proportion of the masked material region in the corresponding region is the threshold value or more, the mask determination unit 152 may determine that masking is occurring, and when the proportion is less than the threshold value, the mask determination unit 152 may determine that masking is not occurring.

Figure 8A:
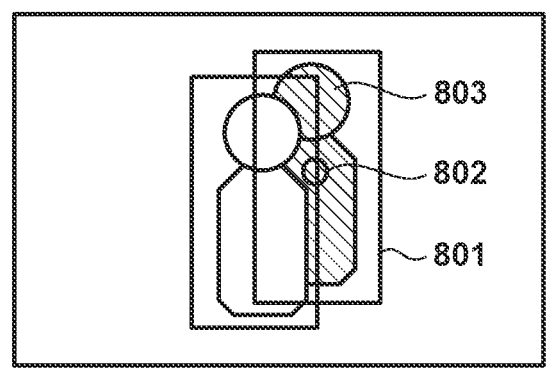
FIGS. 8A and 8B are diagrams illustrating a detection example of occurrence of masking.

In the example of FIG. 8A, a corresponding region 802 corresponding to the masking determination region is located in a corresponding region 801 corresponding to the object candidate region of tracking target in the masked material region map, and a masked material region 803 is included in the corresponding region 802. Therefore, in such a case, the mask determination unit 152 determines that the masking is occurring.

Figure 8B:
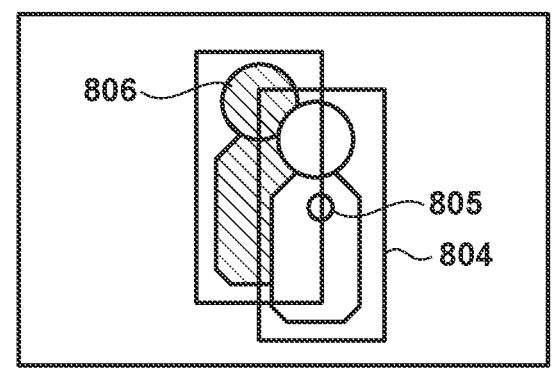

In the example of FIG. 8B, a corresponding region 805 corresponding to the masking determination region is located in a corresponding region 804 corresponding to the object candidate region of tracking target in the masked material region map, and a masked material region 806 is not included in the corresponding region 805. Therefore, in such a case, the mask determination unit 152 determines that the masking is not occurring.

Next, the process of step S302 in the case of the tracking target being the masking material will be described. In the same manner as described above, first, the mask determination unit 152 sets any partial region (for example, a region near the center position of the object candidate region) in the object candidate region of tracking target in the captured image as a masking determination region. Then, the mask determination unit 152 determines whether the condition that "the masking material region map includes the masking material region in the corresponding region corresponding to the masking determination region and the masked material region map includes a masked determination region in the other object candidate region overlapping with the object candidate region of tracking target" is met. As a result of the determination, in a case where such a determination is met, the mask determination unit 152 determines that the masking is terminated, and in a case where such a determination is not met, the mask determination unit 152 determines that the masking is not terminated.

Figure 9A:
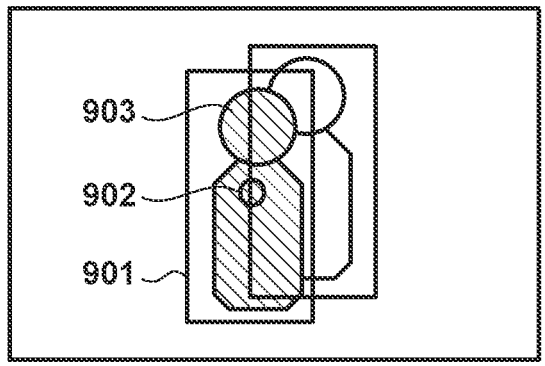
FIGS. 9A and 9B are diagrams illustrating a detection example of termination of masking.
Figure 9B:
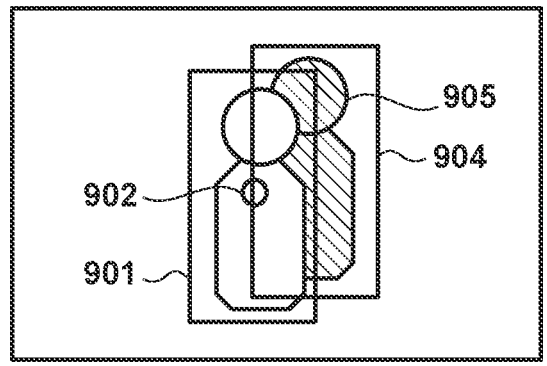

In the example of FIG. 9A, a corresponding region 902 corresponding to the masking determination region is located in a corresponding region 901 corresponding to the object candidate region of tracking target in the masking material region map. A condition that the corresponding region 902 includes a masking material region 903 and as illustrated in FIG. 9B, another object candidate region 904 overlapping with the corresponding region 901 includes a masked determination region 905 in the masking material region map is met. Therefore, in such a case, the mask determination unit 152 determines that the masking is terminated.

Note that when a plurality of other object candidate regions overlapping with the corresponding region corresponding to the object candidate region of tracking target are present in the masking material region map, one object candidate region may be selected among them and whether the masked determination region is included in the selected object candidate region may be determined. As a method of selecting one object candidate region from the plurality of object candidate regions overlapping the corresponding region, for example, a method of selecting the object candidate region having the smallest distance from the corresponding region is applicable, but the method is not limited to a specific selection method.

As the result of the determination, when it is determined that the tracking destination is masked by the masking material in the captured image acquired by the acquisition unit 110 in step S201 or that the masking is terminated, the process proceeds to step S303. On the other hand, as a result of such a determination, when there is not the occurrence of the masking or the termination of the masking, the process proceeds to step S201, and processes in the following respective steps are performed for the next frame.

In step S303, the switching unit 160 switches (selects) the tracking target tracked by the tracking processing unit 140. Here, the operation of the switching unit 160 in step S303 differs between a case where the mask detection unit 150 detects the occurrence of the masking and a case where the termination of the masking is detected.

The switching unit 160 first sets any partial region (for example, a region near the center position of the object candidate region) in the object candidate region as a switching determination region for each object candidate region output by the tracking processing unit 140.

Figure 10A:
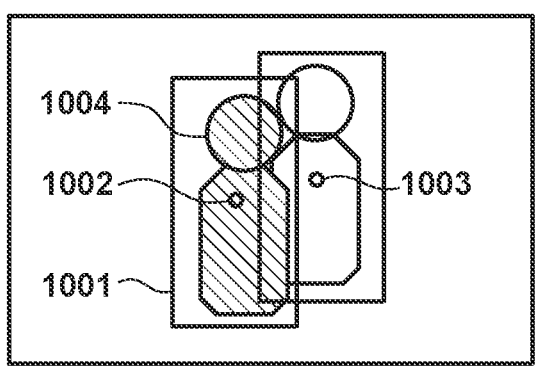
FIGS. 10A and 10B are diagrams describing a process of step S303.

In a case where the mask detection unit 150 detects the occurrence of the masking, the switching unit 160 identifies the corresponding region having the highest proportion occupied by the masking material region among the corresponding regions corresponding to the switching determination region in the masking material region map. Then, the switching unit 160 determines (selects) the object of the object candidate region corresponding to the identified corresponding region as a tracking target. In the example of FIG. 10A, among corresponding regions 1002, 1003 corresponding to the switching determination region in the masking material region map, the corresponding region having the highest proportion occupied by a masking material region 1004 is the corresponding region 1002. Thus, the object in an object candidate region 1001 corresponding to the corresponding region 1002 (the object corresponding to the masking material region 1004) is determined (selected) as the tracking target.

Figure 10B:
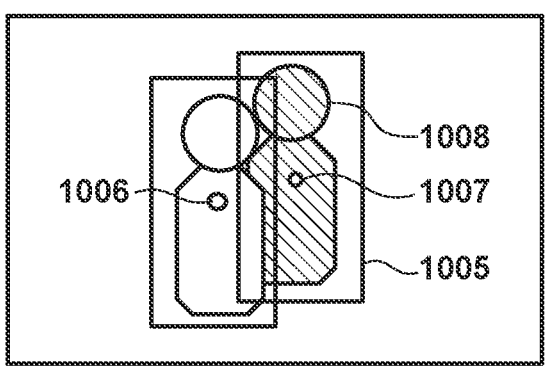

In a case where the mask detection unit 150 detects the termination of the masking, the switching unit 160 identifies the corresponding region having the highest proportion occupied by the masked material region among the corresponding regions corresponding to the switching determination region in the masked material region map. Then, the switching unit 160 determines (selects) the object of the object candidate region corresponding to the identified corresponding region as a tracking target. In the example of FIG. 10B, among corresponding regions 1006, 1007 corresponding to the switching determination region in the masked material region map, the corresponding region having the highest proportion occupied by a masked material region 1008 is the corresponding region 1007. Thus, the object in an object candidate region 1005 corresponding to the corresponding region 1007 (object corresponding to the masked material region 1008) is determined (selected) as the tracking target.

In this manner, according to the present embodiment, the tracking target is switched by the method using the masking material region or the masked material region, and thus the tracking destination can be more accurately tracked as in the first embodiment.

Third Embodiment

In the present embodiment, even when the mask detection unit 150 detects the occurrence of the masking, the tracking target is not promptly switched, but whether to perform switching is determined according to the degree of masking of tracking target.

Figure 11:
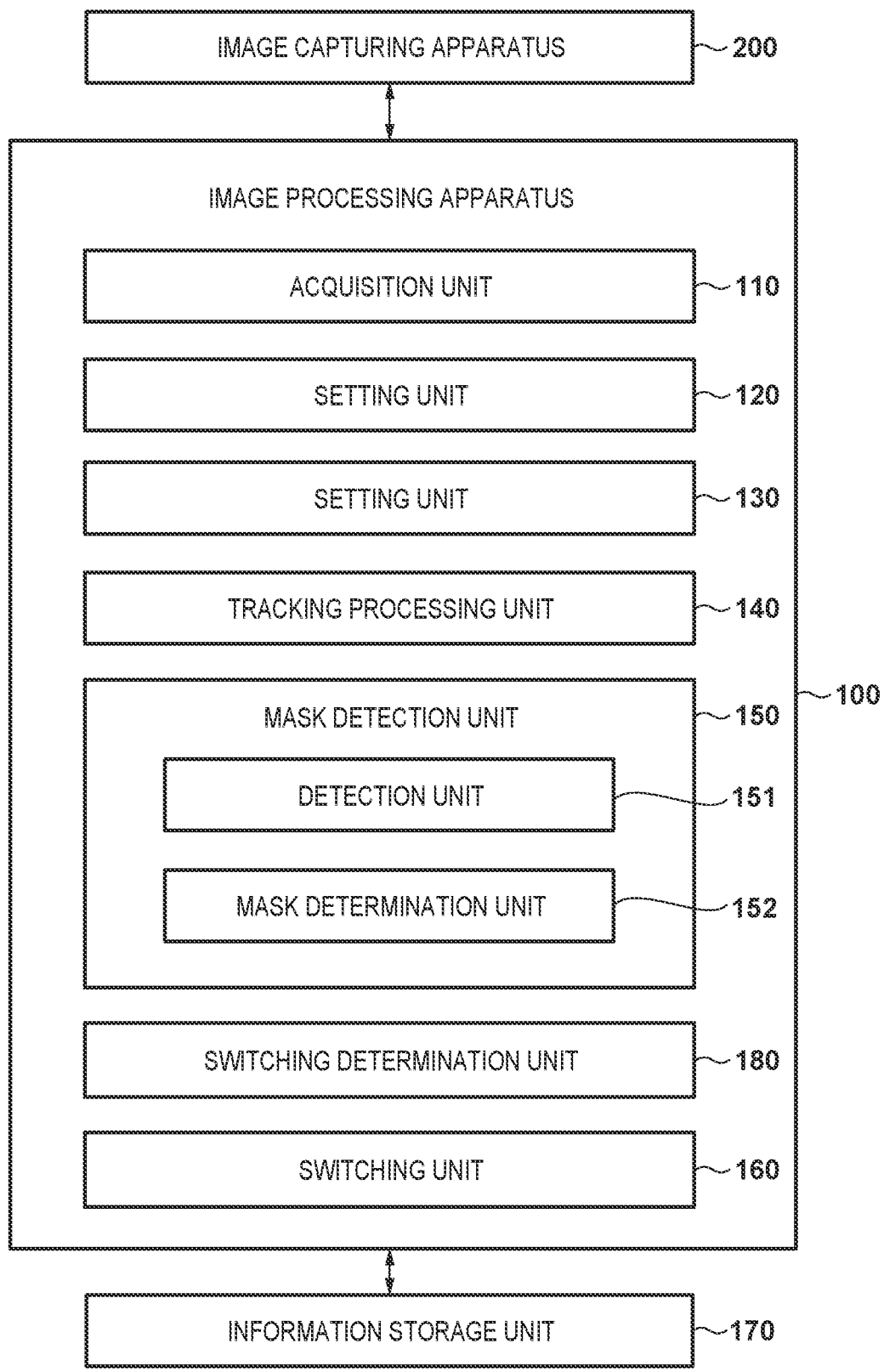
FIG. 11 is a block diagram illustrating a functional configuration example of a system.

A functional configuration example of a system according to the present embodiment will be described using a block diagram of FIG. 11. As illustrated in FIG. 11, the system according to the present embodiment has a configuration in which a switching determination unit 180 is added to the image processing apparatus 100 in FIG. 5.

Figure 12:
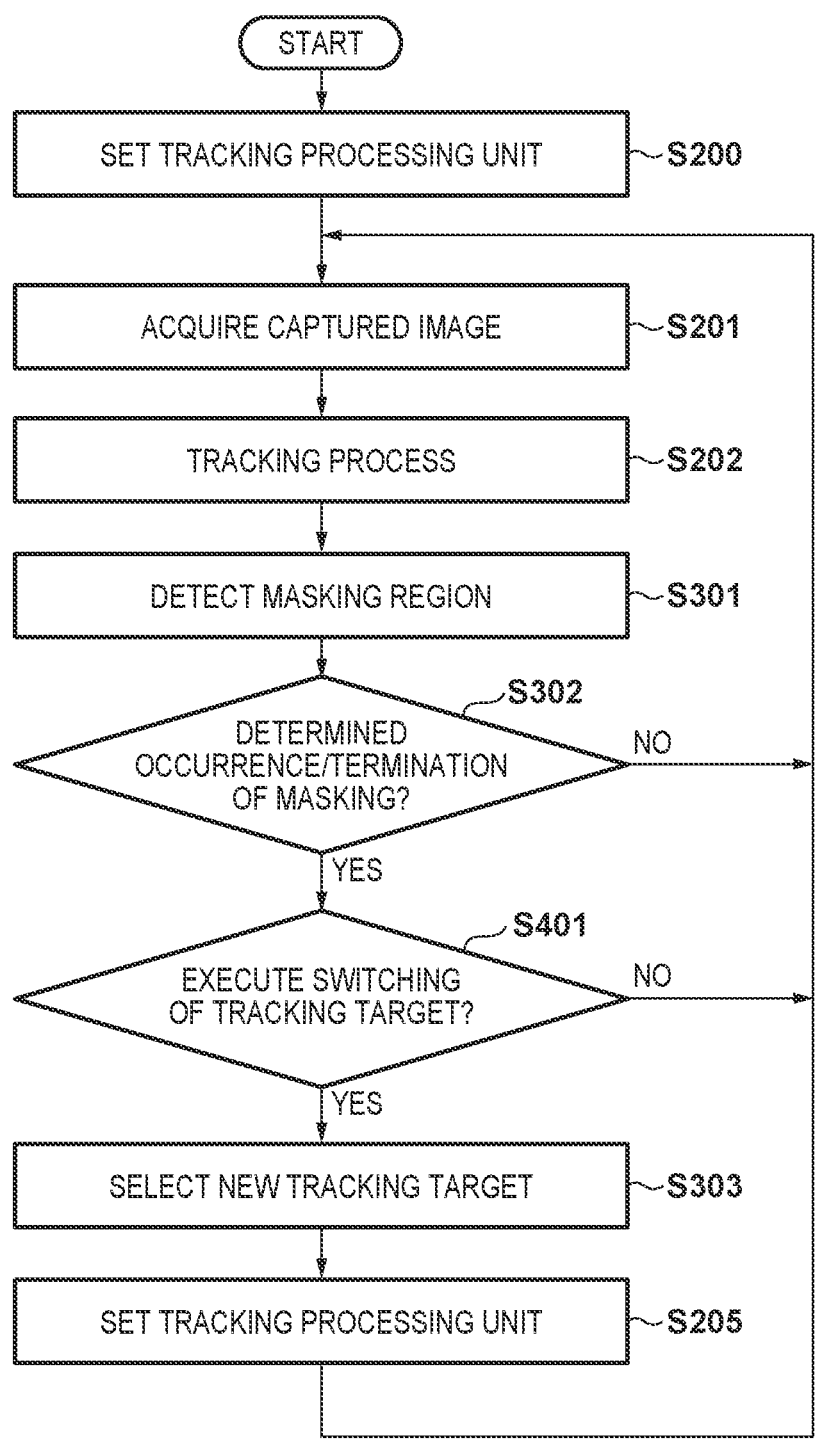
FIG. 12 is a flowchart of the tracking process.

Next, processes performed by the image processing apparatus 100 to track the tracking target in the respective captured images output from the image capturing apparatus 200 after the setting process described above will be described with reference to the flowchart of FIG. 12. In FIG. 12, process steps identical to process steps depicted in FIG. 6 bear the same step numbers thereof, with descriptions of the process steps being omitted.

As the result of the determination in step S302, when it is determined that the tracking destination is masked by the masking material in the captured image acquired by the acquisition unit 110 in step S201 or that the masking is terminated, the process proceeds to step S401. On the other hand, as a result of such a determination, when there is not the occurrence of the masking or the termination of the masking, the process proceeds to step S201, and processes in the following respective steps are performed for the next frame.

In step S401, the switching determination unit 180 determines whether to switch the tracking target. As a result of this determination, when the tracking target is switched, the process proceeds to step S303, and when the tracking target is not switched, the process proceeds to step S201, and processes in the following respective steps are performed for the next frame.

As an example of the method for determining switching of the tracking target, a method for determining that the tracking target is switched when the object region of tracking destination disappears is considered. Hereinafter, the process in the case of detecting the occurrence of the masking will be described, and the process in the case of detecting the termination of the masking is similar to that of the above-described embodiment.

For example, when a condition that "the mask detection unit 150 detects masking and the object candidate region including 0% or more of the area (such as the number of pixels) of the masked material region output by the detection unit 151 is absent" is met, it is determined that the object region of tracking destination disappears from the captured image.

Figure 13A:
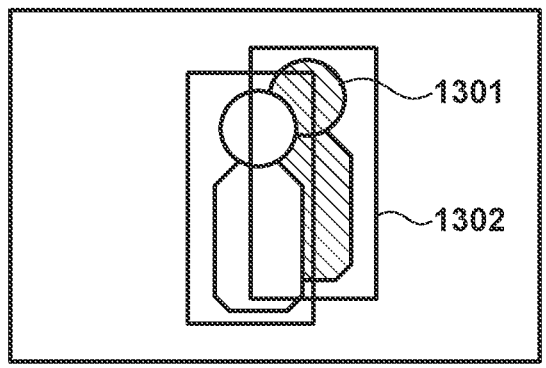
FIGS. 13A and 13B are diagrams describing an example of a method for determining switching of a tracking target.
Figure 13B:
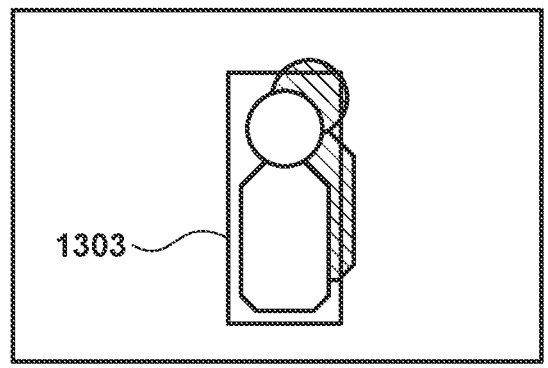

The masked material region maps in FIGS. 13A and 13B are the masked material region maps in a state where masking is detected by the mask detection unit 150. Here, assume that 0=30%. At this time, in the masked material region map in FIG. 13A, a corresponding region 1302 corresponding to the object candidate region of the masked material includes 30% or more of a masked material region 1301 of the masked material, and therefore the object region of tracking destination is determined as not being disappeared. On the other hand, in the masked material region map in FIG. 13B, "the corresponding region corresponding to the object candidate region of the masked material" including 30% or more of a masked material region 1303 of the masked material is not present, and therefore the object region of tracking destination is determined to disappear.

In addition, as a method for determining switching of the tracking target, for example, the tracking target may be determined to be switched to the masking material in a case where "termination of masking" is never detected during a predetermined period after detecting the occurrence of the masking. In addition, for example, the tracking target may be determined to be switched to the tracking destination in a case where "masking" is never detected during a predetermined period after detecting the termination of the masking.

In the present embodiment, the tracking processing unit 140 generates tracking candidate information for each captured image in the period from when the mask detection unit 150 detects the occurrence of the masking until the switching determination unit 180 determines the switching of tracking destination and stores the tracking candidate information in the information storage unit 170. The tracking candidate information includes information that defines the position and size of the object candidate region detected from the captured image by the tracking processing unit 140, an image in the object candidate region, and a flag that indicates whether the object candidate region is the object candidate region of the masking material. The flag takes two values of TRUE and FALSE. TRUE indicates that "the object candidate region is the object candidate region of the masking material" and FALSE indicates that "the object candidate region is not the object candidate region of the masking material".

In step S303, among pieces of the tracking candidate information stored in the information storage unit 170, the switching unit 160 selects one piece of the tracking candidate information of the flag being TRUE, and selects the object of the object candidate region corresponding to the selected tracking candidate information as the tracking target. At this time, rather than selecting one piece of tracking candidate information, a plurality of pieces of tracking candidate information may be used in combination.

Then, in step S205, the switching unit 160 instructs the setting unit 130 to set "the tracking model for tracking the tracking target selected in step S303" as the tracking model used for tracking the tracking target by the tracking processing unit 140. In this case, when the tracking model is the online learning model the performs online learning, the online learning model may be learned using the stored tracking candidate information.

Thus, in the present embodiment, the mask detection unit 150 and the switching determination unit 180 perform two-step masking determination. Thus omitting switching of the tracking target in the case of minor masking in which the tracking destination is not completely hidden allows omitting an unnecessary calculation process.

In addition, in the case where the tracking model is the online learning that performs online learning, performing the learning using the tracking candidate information stored in the information storage unit 170 during setting of the tracking processing unit 140 allows improving tracking accuracy after tracking target switching.

Note that in the above-described embodiments, the case in which each of the functional units in the image processing apparatus 100 illustrated in FIGS. 2, 5, and 11 is implemented by software (a computer program) has been described, but one or more of these functional units may be implemented in hardware.

Additionally, in the above-described embodiments, the image capturing apparatus 200 and the image processing apparatus 100 are described as different apparatuses. However, the image capturing apparatus 200 and the image processing apparatus 100 may be integrated to constitute one apparatus including the functions of the image capturing apparatus 200 and the functions of the image processing apparatus 100. The information storage unit 170 is not configured as an external device of the image processing apparatus 100 but may be integrated with the image processing apparatus 100.

Additionally, in the above-described embodiments, the tracking process of the captured image acquired from the captured image has been described, but another process may be performed in addition to the tracking process as a process related to the captured image. For example, the CPU 101 may cause the display unit 105 to display information for notifying the user of the object region of tracking target in the captured image in addition to the captured image acquired from the image capturing apparatus 200. The "information for notifying the user of the object region of tracking target" includes one or more pieces of information, such as the frame of the object region, a recognition result of the tracking target in the object region (for example, type (such as person, dog, vehicle, head, arm, and foot), age, and gender).

Thus, the system described in the above-described embodiments may be implemented by one apparatus or may be configured by any number of two or more apparatuses. In this case, whether the respective functions of the system described in the above-described embodiments are performed by which apparatus is modified as appropriate, and any configuration is possible.

Alternatively, the numerical values, processing timings, processing orders, processing entities, and data (information) transmission destinations/transmission sources/storage locations, and the like used in the embodiments described above are referred to for specific description as an example, and are not intended for limitation to these examples.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-196465, filed Dec. 2, 2021, which is hereby incorporated by reference herein in its entirety.

What is claimed is:

1. An image processing apparatus, comprising:
at least one processor; and
at least one memory having stored thereon instructions which, when executed by the at least one processor, cause the image processing apparatus at least to:
perform a tracking process, using a tracking model, in which a tracking target in a captured image is tracked; and
switch the tracking model to a first model that tracks a second object as the tracking target when masking of a first object by the second object is detected while the first object is tracked as the tracking target, and to switch the tracking model to a second model that tracks the first object as the tracking target when termination of the masking is detected,
wherein the masking of the first object by the second object is detected based on a first map representing a region of the first object in the captured image.

2. The image processing apparatus according to claim 1, wherein
while the first object is tracked as the tracking target, when the masking of the first object by the second object is detected, the tracking model is switched to the first model constructed using an image of the second object, and when the termination of the masking is detected, the tracking model is switched to the second model constructed using an image of the first object.

3. The image processing apparatus according to claim 1, wherein
when the masking is detected, the second object is determined as the tracking target based on a candidate of a region of the first object in the captured image and a second map representing a region of the second object in the captured image, and the tracking model is switched to the first model that tracks the determined second object as the tracking target.

4. The image processing apparatus according to claim 1, wherein
the termination of the masking is detected based on a second map representing a region of the second object in the captured image.

5. The image processing apparatus according to claim 4, wherein
when the termination of the masking is detected, the first object is determined as the tracking target based on a candidate of a region of the first object in the captured image and a first map representing a region of the first object in the captured image, and the tracking model is switched to the second model that tracks the determined first object as the tracking target.

6. The image processing apparatus according to claim 1, wherein
when the masking is detected, whether to perform the switching is determined based on a candidate of a region of the first object in the captured image and a first map representing a region of the first object in the captured image.

7. The image processing apparatus according to claim 1, wherein
the first model and the second model include a neural network and template matching.

8. The image processing apparatus according to claim 1, further comprising
an image capturing device configured to capture the captured image.

9. An image processing method, comprising:
performing a tracking process, using a tracking model, in which a tracking target in a captured image is tracked; and
switching the tracking model to a first model that tracks a second object as the tracking target when masking of a first object by the second object is detected while the first object is tracked in the tracking as the tracking target, and switching the tracking model to a second model that tracks the first object as the tracking target when termination of the masking is detected, wherein the masking of the first object by the second object is detected based on a first map representing a region of the first object in the captured image.

10. A non-transitory computer-readable storage medium that stores a computer program for causing a computer having at least one processor, when executing the computer program to:

perform a tracking process, using a tracking model, in which a tracking target in a captured image is tracked; and switch the tracking model to a first model that tracks a second object as the tracking target when masking of a first object by the second object is detected while the first object is tracked as the tracking target, and to switch the tracking model to a second model that tracks the first object as the tracking target when termination of the masking is detected, wherein the masking of the first object by the second object is detected based on a first map representing a region of the first object in the captured image.

* * * * *